(12) United States Patent
Smith et al.

(10) Patent No.: US 7,104,511 B2
(45) Date of Patent: Sep. 12, 2006

(54) ADJUSTABLE SUPPORT FOR MULTIMEDIA DISPLAY DEVICE

(75) Inventors: David L Smith, Corvallis, OR (US); Dennis R. Esterberg, Philomath, OR (US); Jeffrey Scott Bakkom, Corvallis, OR (US); Timothy M. Souza, Lebanon, OR (US); Ralph W. Kinser, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 10/946,778

(22) Filed: Sep. 22, 2004

(65) Prior Publication Data

US 2006/0060731 A1    Mar. 23, 2006

(51) Int. Cl.
    *F16M 11/24* (2006.01)
(52) U.S. Cl. ................................ 248/188.2; 353/70
(58) Field of Classification Search ............ 248/188.2, 248/188.4, 188.8, 188.1, 673, 677; 312/223.2; 353/119, 70
    See application file for complete search history.

(56) References Cited

U.S. PATENT DOCUMENTS

| | | |
|---|---|---|
| 2,756,956 A | 7/1956 | Anderson |
| 3,030,730 A | 4/1962 | Costar |
| 3,704,848 A | 12/1972 | Trebes et al. |
| 4,141,523 A | 2/1979 | Brendgens |
| 4,798,359 A | 1/1989 | Ball |
| 4,925,137 A | 5/1990 | Hastings |
| 5,153,633 A | 10/1992 | Otani |
| 5,630,659 A | 5/1997 | Ronzani et al. |
| 5,676,442 A | 10/1997 | Fujimori |
| 5,743,610 A | 4/1998 | Yajima et al. |
| 5,818,950 A | 10/1998 | Sakamoto et al. |
| 5,909,944 A | 6/1999 | Yajima et al. |
| 6,007,205 A | 12/1999 | Fujimori |
| 6,095,653 A | 8/2000 | Yajima |
| 6,302,543 B1 * | 10/2001 | Arai et al. ............... 353/70 |
| 6,461,002 B1 * | 10/2002 | Su ........................... 353/119 |
| 6,523,799 B1 | 2/2003 | Su |
| 6,715,890 B1 * | 4/2004 | Huang et al. ............ 353/119 |
| 6,902,140 B1 * | 6/2005 | Huang ..................... 248/188.4 |
| 2002/0140909 A1 | 10/2002 | Tanaka |
| 2003/0038927 A1 | 2/2003 | Alden |
| 2003/0038928 A1 | 2/2003 | Alden |
| 2003/0106972 A1 * | 6/2003 | Hsu et al. ............... 248/188.2 |
| 2003/0202162 A1 | 10/2003 | Arai et al. |
| 2003/0227601 A1 | 12/2003 | Chang |
| 2004/0026580 A1 * | 2/2004 | Schauer .................. 248/188.4 |
| 2004/0041988 A1 | 3/2004 | Kitamura |
| 2005/0078283 A1 * | 4/2005 | Lee et al. ................ 353/119 |
| 2006/0006295 A1 * | 1/2006 | Gainer .................... 248/188.4 |

FOREIGN PATENT DOCUMENTS

EP    0 081 960    6/1983

* cited by examiner

*Primary Examiner*—Ramon O Ramirez

(57) ABSTRACT

An adjustable support for a multimedia display device includes a base and a foot rotatably coupled with the base. The base includes a plurality of ramp surfaces, and the foot includes a plurality of engaging surfaces. The plurality of ramp surfaces are separate from each other and distributed at substantially equal intervals along a common circumference, and each of the engaging surfaces interacts with a respective one of the ramp surfaces, wherein rotation of the foot relative to the base causes each of the engaging surfaces to slide along the respective one of the ramp surfaces to vary a distance the foot extends from the base.

51 Claims, 8 Drawing Sheets

ADJUSTABLE SUPPORT FOR MULTIMEDIA DISPLAY DEVICE

BACKGROUND

Image projectors are commonly used to project slide presentations or other images onto a screen or projection surface to aid in business presentations, classroom presentations, recreational or home viewing, etc. When projecting an image, the image projector is typically placed on a platform or support surface such as a desk, table, shelf, cart, etc.

Characteristics of the support surface, such as the height and/or orientation of the support surface, however, may affect the projected image. For example, if the support surface is not level, the projected image may be skewed or distorted. In addition, if the support surface is not at a proper height with respect to the projection surface, the projected image may not be seen on or may only partially be seen on the projection surface.

Accordingly, it is desirable for an adjustable device for increasing the height of the image projector, increasing the angle at which the image is projected, and/or adjusting the orientation of the image projector.

SUMMARY

Once aspect of the present invention relates to an adjustable support for a multimedia display device. The adjustable support includes a base and a foot rotatably coupled with the base. The base includes a plurality of ramp surfaces, and the foot includes a plurality of engaging surfaces. The plurality of ramp surfaces are separate from each other and distributed at substantially equal intervals along a common circumference, and each of the engaging surfaces interacts with a respective one of the ramp surfaces, wherein rotation of the foot relative to the base causes each of the engaging surfaces to slide along the respective one of the ramp surfaces to vary a distance the foot extends from the base.

DETAILED DESCRIPTION

In the following detailed description, reference is made to the accompanying drawings which form a part hereof, and in which is shown by way of illustration specific embodiments in which the invention may be practiced. In this regard, directional terminology, such as "upper," "lower," "downward," "upward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
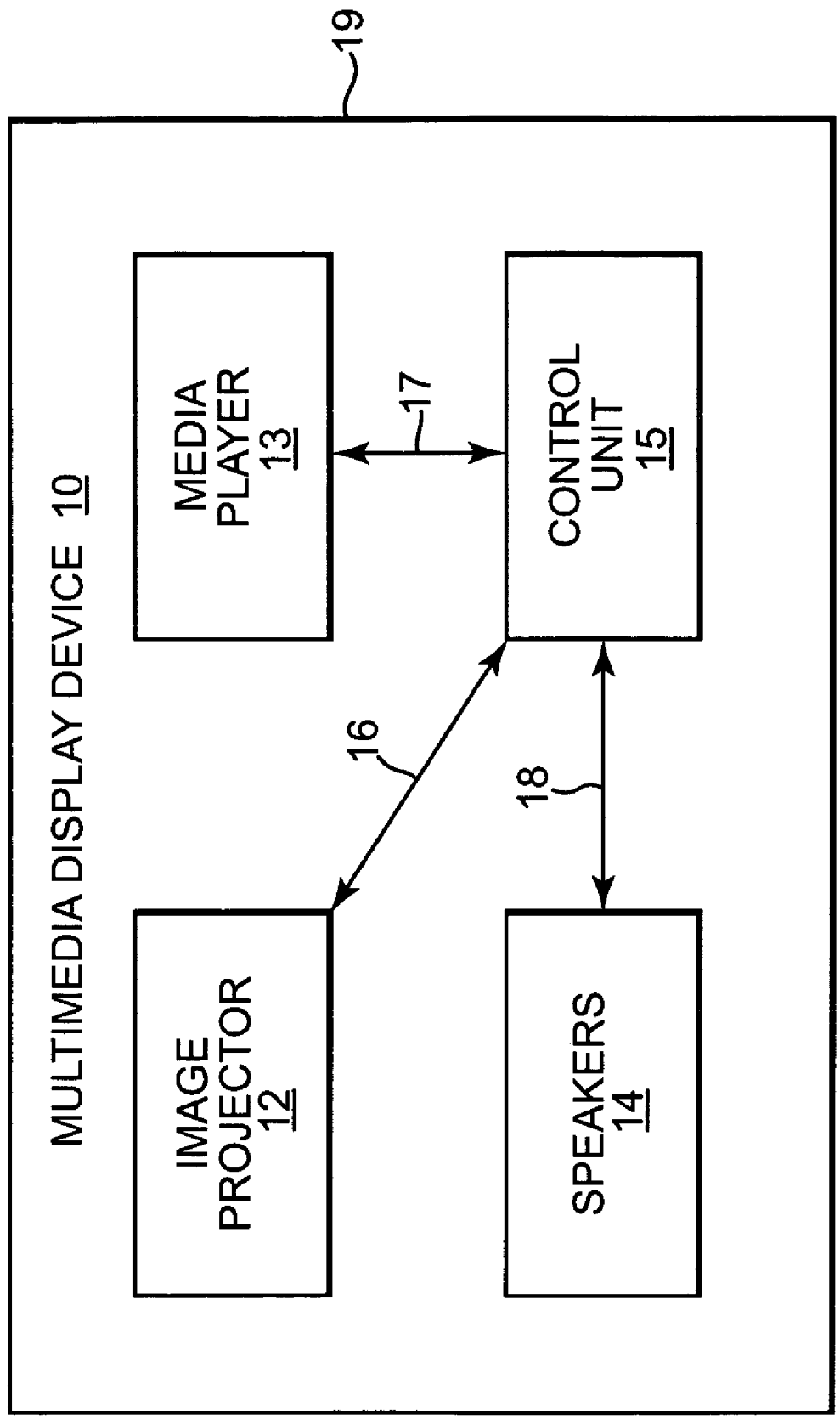
FIG. 1 is a block diagram illustrating one embodiment of a multimedia display device.

FIG. 1 illustrates one embodiment of a multimedia display device 10. Multimedia display device 10 includes an image projector 12, a media player 13, one or more speakers 14, and a control unit 15. Image projector 12 receives a video signal and projects corresponding images to a viewing surface using various optical elements. Image projector 12 is any type of image projection device, such as, a liquid crystal display (LCD) projector, a digital light processing (DLP) projector, a liquid crystal or silicon (LCOS) projector, a slide projector, a film projector, etc.

Media player 13 provides audio and/or video content to image projector 12. In one embodiment, media player 13 provides the audio or video from a disc, such as a digital video disc (DVD), a compact disc (CD) (e.g., CD-ROM, CD-R, CD-RW, and CD+RW), or other disc configured to store audio and/or video content. Speakers 14 generate audible sounds in response to audio inputs, such as audio inputs from media player 13.

Control unit 15 includes a processor and memory and is coupled to each of image projector 12, media player 13, and speakers 14 via electrical and/or communication links 16,17, and 18, respectively. In one embodiment, control unit 15 provides signals to image projector 12, media player 13, and speakers 14 to control the power supply to each, provide instructions to each, and coordinate the respective functioning of each of image projector 12, media player 13, and speakers 14.

In one embodiment, one or more components of multimedia display device 10 are housed within a housing 19. For example, housing 19 may contain image projector 12, media player 13, control unit 15, and one or more speakers 14. In one embodiment, as described below, housing 19 includes a first portion housing image projector 12, media player 13, and control unit 15, and a second portion housing one or more speakers 14.

Figure 2:
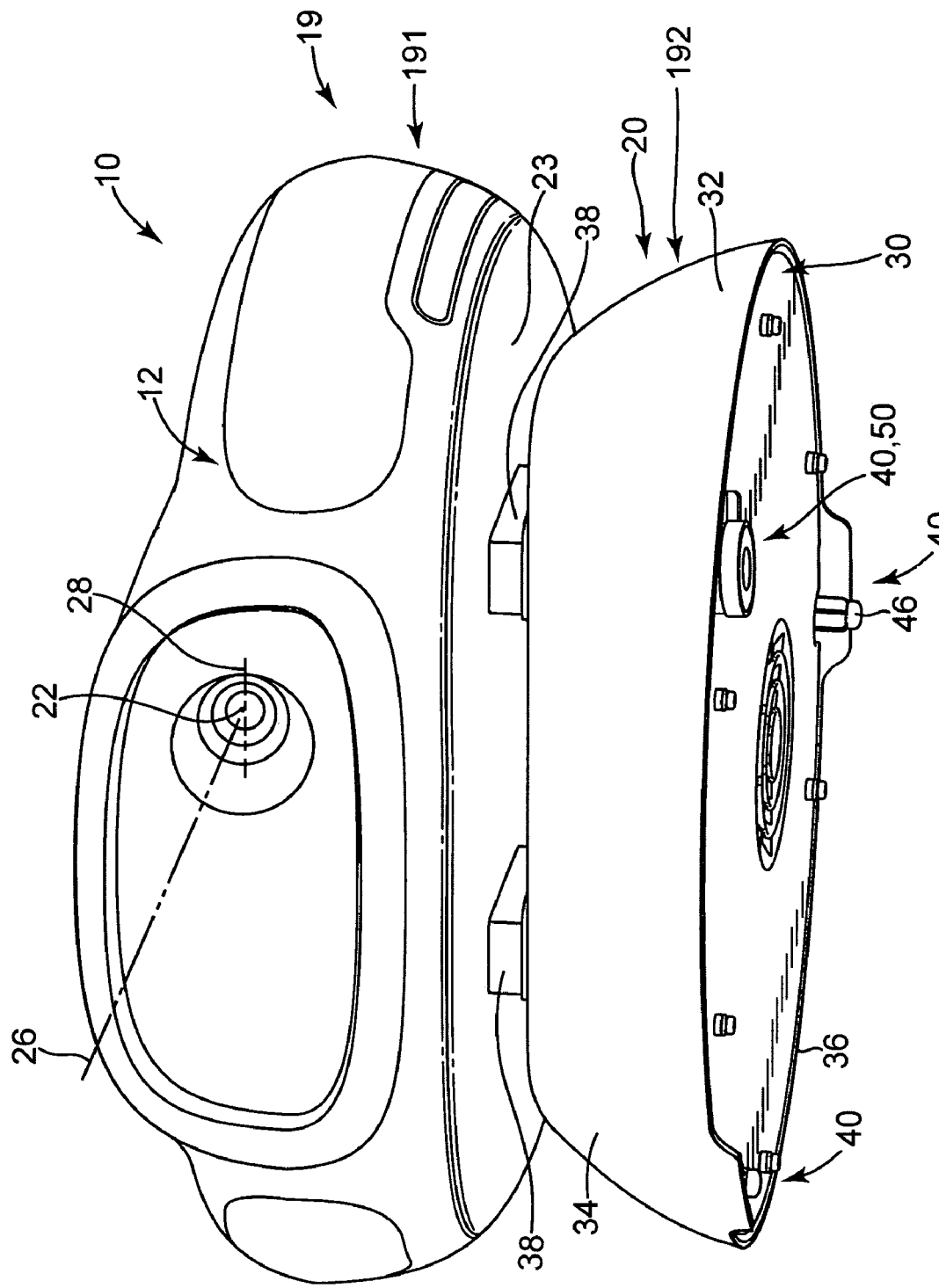
FIG. 2 is a bottom perspective view illustrating one embodiment of the multimedia display device.

FIG. 2 illustrates one embodiment of multimedia display device 10 including image projector 12 and a support assembly 20 which forms a portion of housing 19. In one embodiment, image projector 12 is supported by and mounted to support assembly 20. In one embodiment, housing 19 includes a first portion 191 and a second portion 192 such that image projector 12 is housed within first portion 191 of housing 19 and speaker 14 is housed within second portion 192 of housing 19. As such, speaker 14 is positioned below image projector 12. In one embodiment, first portion 191 of housing 19 also includes or houses media player 13 and/or control unit 15 (FIG. 1). In one embodiment, image projector 12 additionally defines a lower surface 23 for selectively interacting with support assembly 20.

Figure 3:
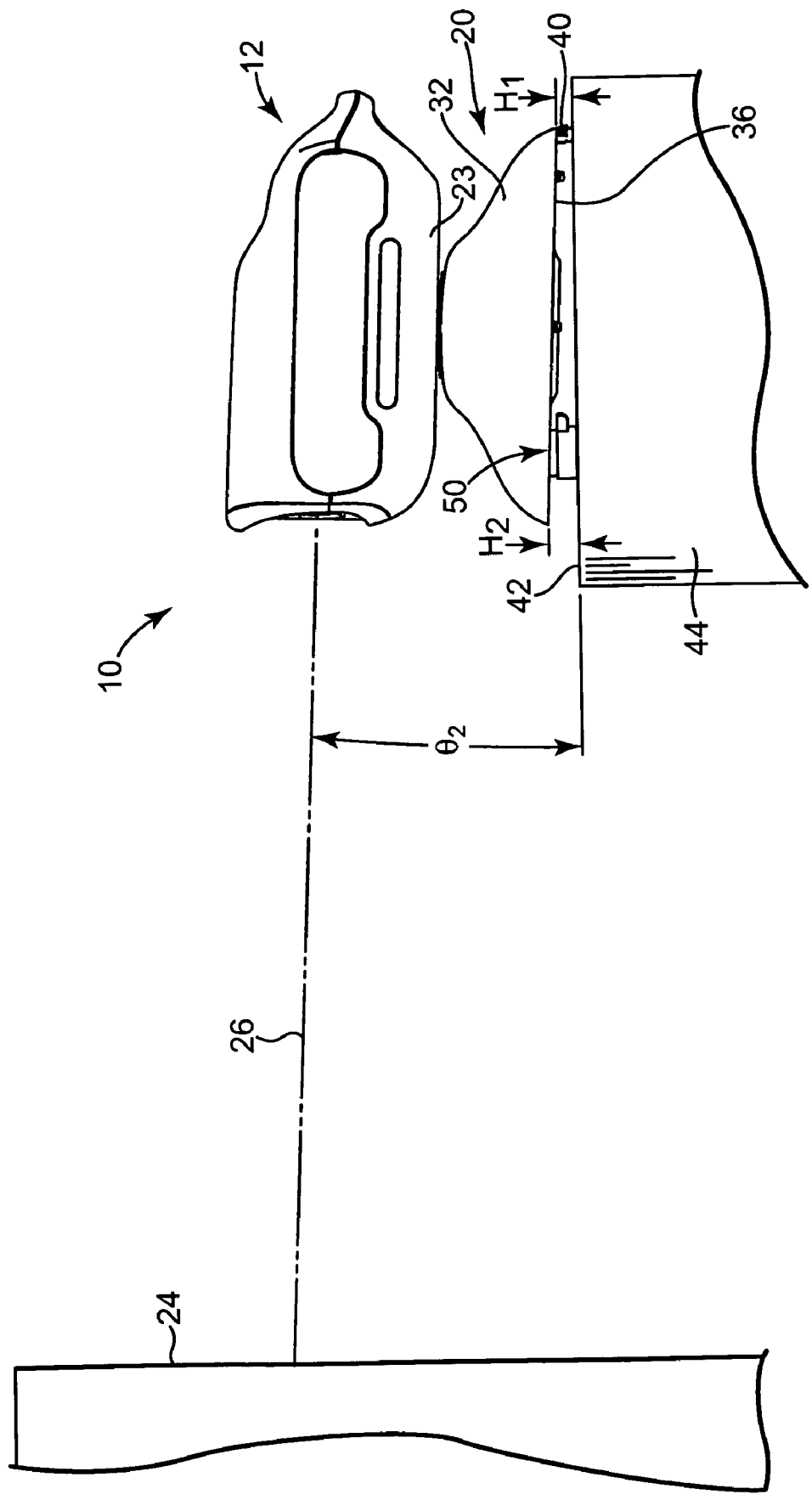
FIG. 3 is a side view illustrating one embodiment of the multimedia display device of FIG. 2 with an associated platform and a viewing surface.

In one embodiment, as illustrated in FIGS. 2 and 3, image projector 12 includes a lens 22 from which an image is projected towards a screen or other viewing surface 24. More particularly, light patterns defining images are projected from lens 22 to viewing surface 24. The projection of light is centered about a projection line 26 extending from lens 22 to viewing surface 24. In addition, a reference line 28 is defined extending across and through the center of lens 22 (i.e., through opposite points of the perimeter of lens 22) with an orientation substantially perpendicular to projection line 26.

Figure 4:
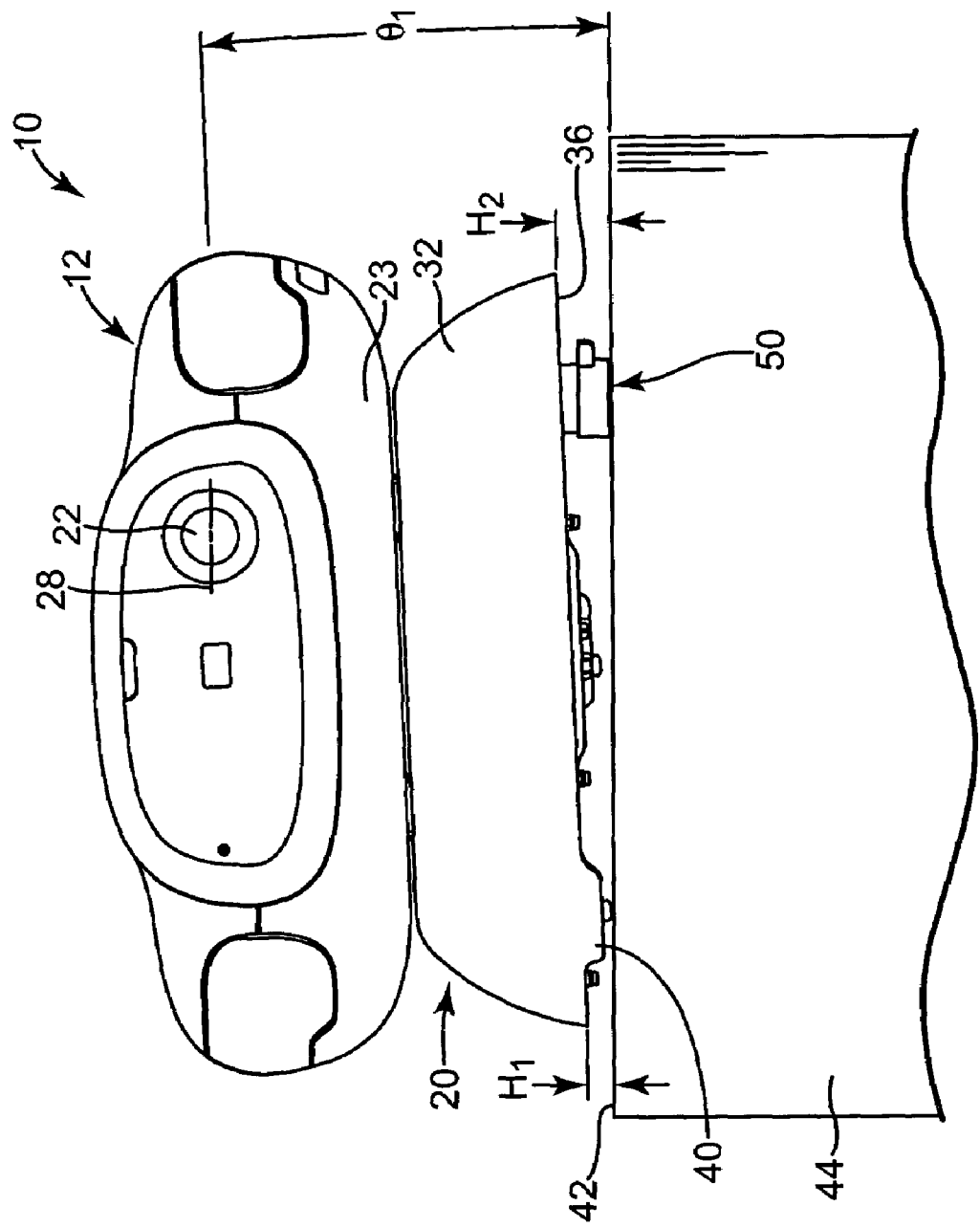
FIG. 4 is a front view illustrating one embodiment of the multimedia display device of FIG. 2 with an associated platform.

Support assembly 20 supports image projector 12 and is configured to receive image projector 12 in either a substantially horizontal orientation, one embodiment of which is illustrated in FIGS. 2–4, a substantially vertical orientation (not illustrated), or other intermediate orientation. Components of support assembly 20 may be composed of any material capable of providing structural support to the internal components of support assembly 20 as well as image projector 12 such as, plastics, metals, or composite materials. Similarly, support assembly 20 may be fabricated using any number of fabrication techniques including rotational molding, blow molding, deep draw molding, injection molding, casting, forging, stamping, etc.

In one embodiment, support assembly 20 includes a cabinet assembly 30 and a shell or shroud 32 at least partially enclosing cabinet assembly 30. In one embodiment, cabinet assembly 30 houses one or more components for use in conjunction with image projector 12. In one embodiment, cabinet assembly 30 houses one or more speakers 14 (FIG. 1).

In one embodiment, shell 32 has an external surface 34 shaped in a substantially convex manner and defines an internal cavity which encloses cabinet assembly 30. As such, a perimeter edge 36 is defined around the internal cavity between the internal cavity and external surface 34 of shell 32. In one embodiment, shell 32 includes docking projections 38 extending upward from external surface 34 and configured to be selectively or permanently received by corresponding recesses or other features in lower surface 23 of image projector 12. As such, image projector 12 may be supported by and selectively removed from support assembly 20.

In one embodiment, as illustrated in FIGS. 2–4, support assembly 20 further includes a plurality of supports 40 extending from perimeter edge 36 away from shell 32. More specifically, each support 40 extends downwardly from perimeter edge 36. In one embodiment, supports 40 are substantially equally spaced around perimeter edge 36, and each support 40 is configured to interact with a support surface 42 of a platform 44 such as a table, desk, shelf, cart, etc. In one embodiment, the plurality of supports 40 includes three supports 40 equally spaced about perimeter edge 36 to collectively form a tripod-like support for shell 32. In one embodiment, one or more supports 40 additionally includes a friction enhancing portion or anti-skid foot or surface 46 for interacting with support surface 42 to substantially prevent or decrease inadvertent movement of multimedia display device 10 along support surface 42.

Figure 5:
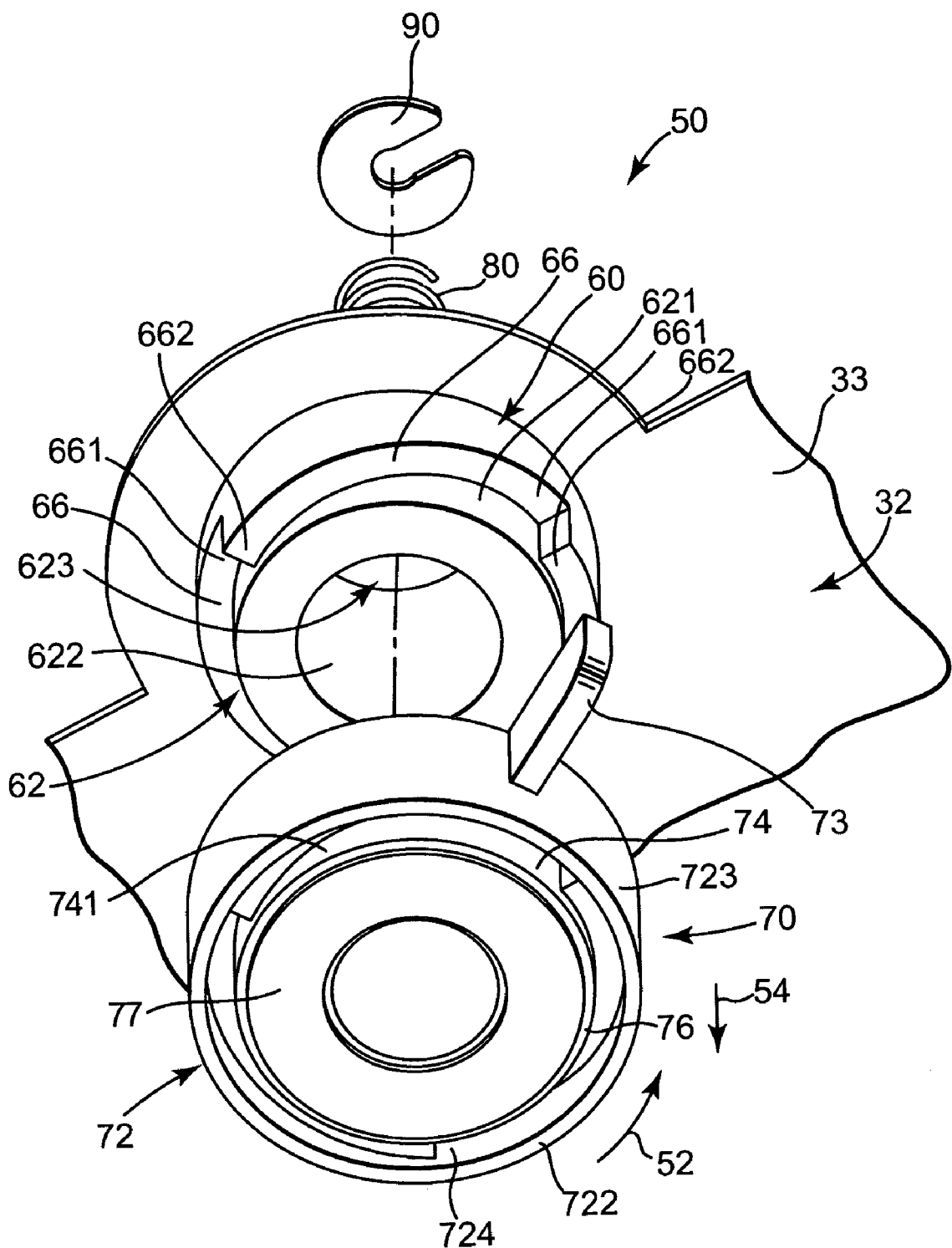
FIG. 5 is an exploded, bottom perspective view illustrating one embodiment of an adjustable support for a multimedia display device.
Figure 6:
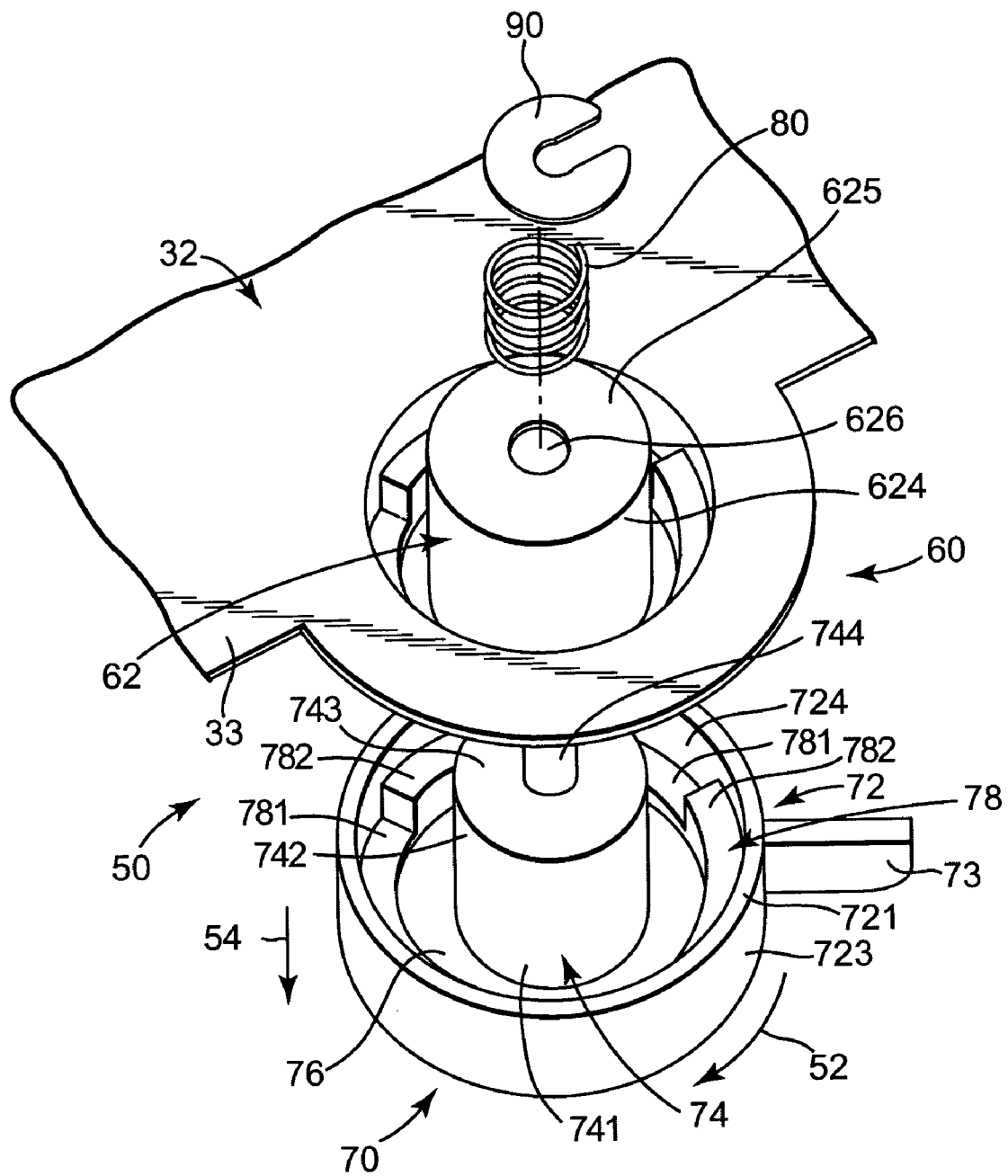
FIG. 6 is an exploded, top perspective view of the adjustable support of FIG. 5.

In one embodiment, at least one support 40 is an adjustable support 50. One embodiment of adjustable support 50 is illustrated in FIGS. 5 and 6. In one embodiment, adjustable support 50 includes a base 60, a foot 70, a spring 80, and a retainer 90. In one embodiment, base 60 extends from a flange 33 of shell 32. Flange 33 may extend, for example, from perimeter edge 36 (FIG. 2) of shell 32. In addition, base 60 may be formed integrally with and/or fixed with respect to shell 32.

In one embodiment, base 60 includes a cylindrical portion 62 defining an outer circumference or surface 621, an inner circumference or surface 622, and a cavity 623. In one embodiment, an interior end 624 of cylindrical portion 62 extends through an opening of flange 33 and into shell 32. In addition, an end wall 625 having an aperture 626 formed therein is provided at interior end 624 of cylindrical portion 62.

In one embodiment, base 60 includes a plurality of cam or ramp surfaces 66 formed around cylindrical portion 62. In one embodiment, ramp surfaces 66 are distributed at substantially equal intervals along a common circumference of cylindrical portion 62. As such, ramp surfaces 66 are circumferentially spaced with respect to one another at substantially equal intervals.

In one embodiment, ramp surfaces 66 are inclined ramps circumferentially spaced about outer surface 621. In addition, each ramp surface 66 is discrete from the other ramp surfaces 66. As such, each ramp surface 66 is separate and distinct from the other ramp surfaces 66.

In one embodiment, each ramp surface 66 has a first end 661 and a second end 662, wherein each second end 662 is spaced further from flange 33 than a respective first end 661. In one embodiment, ramp surfaces 66 are spaced such that second end 662 of one ramp surface 66 is adjacent to first end 661 of another ramp surface 66.

In one embodiment, first ends 661 of ramp surfaces 66 are linearly aligned with each other so as to be positioned along a first circumference of base 60, and second ends 662 of ramp surfaces 66 are linearly aligned with each other so as to be positioned along a second circumference of base 60 such that the second circumference of base 60 is spaced from the first circumference of base 60. As such, first ends 661 of ramp surfaces 66 are uniformly spaced from second ends 662.

In one embodiment, as illustrated in FIGS. 5 and 6, each ramp surface 66 includes a curvilinear surface. As such, each ramp surface 66 includes a linear and angled surface following the curvature of outer surface 621. In one embodiment, ramp surfaces 66 are textured or coated to increase friction when interacting with foot 70, as described below.

Foot 70 is configured to rotatably interact with base 60. In one embodiment, foot 70 includes a collar 72, a cylindrical portion 74, and a bottom or support wall 76. Collar 72 is substantially cylindrical and cylindrical portion 74 is concentrically positioned within collar 72. In one embodiment, collar 72 has an upper edge 721 and a lower edge 722 opposite upper edge 721, and includes an outer circumference or surface 723 and an inner circumference or surface 724.

In one embodiment, a handle 73 extends radially outward from outer surface 723 of collar 72. Handle 73 is sized, shaped, and/or textured to facilitate grasping of handle 73 by a user and manipulating of foot 70, as described below.

In one embodiment, foot 70 includes a plurality of engaging surfaces 78 formed within collar 72. In one embodiment, each engaging surface 78 contacts and interacts with one ramp surface 66 of base 60, as described below. In one embodiment, engaging surfaces 78 are inclined ramps circumferentially spaced within inner surface 724 of collar 72. In addition, each engaging surface 78 is discrete from the other engaging surfaces 78. As such, each engaging surface 78 is separate and distinct from the other engaging surfaces 78.

In one embodiment, each engaging surface 78 includes a curvilinear surface complimentary to a respective ramp surface 66. As such, each engaging surface 78 includes a linear and angled surface following the curvature of inner surface 724 of collar 72. In one embodiment, similar to ramp surfaces 66, each engaging surface 78 has a first end 781 and a second end 782 wherein each second end 782 is spaced further from bottom wall 76 of foot 70 than a respective first end 781. In one embodiment, engaging surfaces 78 are spaced such that second end 782 of one engaging surface 78 is adjacent to first end 781 of another engaging surface 78.

In one embodiment, first ends 781 of engaging surfaces 78 are linearly aligned with each other so as to be positioned along a first inner circumference of collar 72, and second ends 782 of engaging surfaces 78 are linearly aligned with each other so as to be positioned along a second inner circumference of collar 72 such that the second inner circumference of collar 72 is spaced from the first inner circumference of collar 72.

In one embodiment, cylindrical portion 74 of foot 70 has a lower edge 741 and an upper edge 742. In one embodiment, lower edge 741 is positioned substantially even with (i.e., in substantially the same plane as) lower edge 722 of collar 72. In one embodiment, cylindrical portion 74 extends beyond upper edge 721 of collar 72 and an end wall 743 is formed at upper edge 742. In one embodiment, an axle or shaft 744 extends from end wall 743. In one embodiment, shaft 744 is positioned concentrically and coaxially with end wall 743 and, therefore, cylindrical portion 74.

In one embodiment, bottom wall 76 of foot 70 extends between lower edge 722 of collar 72 and lower edge 741 of cylindrical portion 74 so as to define a substantially flat surface for interacting with support surface 42 of platform 44 (FIGS. 3 and 4). In one embodiment, a friction enhancing portion or anti-skid material or texture 77 is included on bottom wall 76 to prevent movement or sliding of multimedia display device 10 upon support surface 42 of platform 44 when multimedia display device 10 is supported by foot 70, as described below. In one embodiment, friction-enhancing portion 77 is formed of rubber.

Upon assembly of adjustable support 50, foot 70 is positioned to interact with base 60 such that collar 72 of foot 70 extends around and surrounds outer surface 621 of base 60. In addition, cylindrical portion 74 of foot 70 fits within cavity 623 of base 60. As such, shaft 744 of foot 70 extends through aperture 626 defined in end wall 625 of base 60. Notably, shaft 744 extends through and beyond aperture 626.

In one embodiment, spring 80 is longitudinally positioned around shaft 744 such that one end of spring 80 interacts with end wall 625. Spring 80 is compressed and retainer 90 is coupled to shaft 744 to maintain the compression of spring 80 against end wall 625. In one embodiment, spring 80 is configured to bias foot 70 toward shell 32. Accordingly, spring 80 maintains the position of foot 70 with respect to shell 32 and, therefore, base 60. Thus, even upon lifting of multimedia display device 10 from support surface 42 of platform 44, spring 80 maintains the position of foot 70 with respect to shell 32.

Assembly of foot 70 with base 60 positions each of the plurality of engaging surfaces 78 to interact with one of the plurality of ramp surfaces 66. In one embodiment, foot 70 is initially positioned with respect to base 60 such that first end 781 and second end 782 of each engaging surface 78 interacts with second end 662 and first end 661, respectively, of a corresponding ramp surface 66. In one embodiment, the plurality of ramp surfaces 66 includes three distinct or discrete ramp surfaces 66, and the plurality of engaging surfaces 78 includes three distinct or discrete engaging surfaces 78 thereby supporting foot 70 with respect to base 60 in a balanced manner.

During use, rotation of foot 70 with respect to base 60 causes each engaging surface 78 of foot 70 to ride along the corresponding ramp surface 66 of base 60. Due to the inclination of both ramp surfaces 66 and engaging surfaces 78, rotation of foot 70 results in vertical movement of foot 70.

With one support 40 being adjustable support 50, other supports 40 are referred to as stationary or non-adjustable supports 40. In one embodiment, as illustrated in FIGS. 3 and 4, each of the stationary or non-adjustable supports 40 extends between shell 32 and support surface 42 of platform 44 a fixed distance or first height $H_1$. Adjustable support 50, however, extends between shell 32 and support surface 42 a variable distance or second height $H_2$.

In one embodiment, as illustrated in FIGS. 5 and 6, rotation of foot 70 in the direction indicated by arrow 52 results in downward movement of foot 70 with respect to shell 32, as indicated by arrow 54. As such, downward movement of foot 70 with respect to shell 32 increases second height $H_2$ (FIGS. 3 and 4). Similarly, rotation of foot 70 in a direction opposite to that indicated by arrow 52 results in upward movement of foot 70 with respect to shell 32 (i.e., in a direction opposite of that indicated by arrow 54). As such, upward movement of adjustable support 70 with respect to shell 32 decreases second height $H_2$.

Notably, the degree of inclination of ramp surfaces 66 determines an extent to which foot 70 can be adjusted and, more specifically, the range of values of second height $H_2$. Thus, the higher the degree of inclination of each ramp surface 66, the wider the range of second height $H_2$ values. Understandably, higher degrees of inclination of ramp surfaces 66, as compared to lower degrees of inclination, require less degree of rotation of foot 70 to adjust foot 70 and vary second height $H_2$ a desired amount. In addition, with ramp surfaces 66 spaced circumferentially with respect to each other at substantially equal intervals, rotation of foot 70 for less than one revolution varies the distance foot 70 extends from shell 32 between a minimum value of second height $H_2$ and a maximum value of second height $H_2$. As such, a total amount of adjustment of foot 70 can be achieved by rotating foot 70 less than 360 degrees.

As illustrated in the embodiments of FIGS. 3 and 4, by varying second height $H_2$ with first height Ha substantially constant, the orientation of projection line 26 and/or reference line 28 of lens 22 accordingly vary with respect to support surface 42. For example, as illustrated in the embodiment of FIG. 4, as adjustable support 50 is adjusted, the orientation of reference line 28 with respect to support surface 42 accordingly changes, thereby adjusting the tilt of image projector 12, and more specifically, lens 22 with respect to platform 44. As foot 70 is rotated, an angle $\theta_1$ is defined between support surface 42 and reference line 28. Angle $\theta_1$, therefore, represents side-to-side tilting of image projector 12. This side-to-side tilting of image projector 12 and, more particularly, lens 22, correspondingly varies the tilt of the projected image upon viewing surface 24. As such, foot 70 can be adjusted until the projected image has a desired orientation.

In addition, as illustrated in the embodiment of FIG. 3, adjustment of adjustable support 50 adjusts the orientation of projection line 26 with respect to support surface 42 and, therefore, the orientation of the projected image upon viewing surface 24. More specifically, if foot 70 is rotated in the direction indicated by arrow 52 (FIGS. 5 and 6), second height $H_2$ increases. In addition, an angle $\theta_2$ defined between support surface 42 and projection line 26 also increases as second height $H_2$ increases. As such, an increase (or decrease) in angle $\theta_2$ adjusts the position of the projected image upon viewing surface 24. Notably, adjustment of angle $\theta_2$ provides front-to-back tilting of image projector 12 and, more specifically, lens 22.

In one embodiment, rotation of foot 70 in a direction opposite of that indicated by arrow 52 decreases second height $H_2$. With first height $H_1$ substantially constant, a decrease in second height $H_2$ also changes angles $\theta_1$ and $\theta_2$. In one embodiment, when second height $H_2$ becomes smaller than first height $H_1$, angles $\theta_1$ and $\theta_2$ are negatively defined with respect to support surface 42. Furthermore, in one embodiment, when first height $H_1$ is equal to second height $H_2$, angles $\theta_1$ and $\theta_2$ are defined as zero as projection line 26 and reference line 28 are both oriented parallel with support surface 42.

In view of the above, adjustment of adjustable support 50 can be used to vary the orientation of reference line 28 with respect to support surface 42 and, therefore, the side-to-side tilt or leveling of image projector 12 and/or the orientation of projection line 26 with respect to support surface 42 and, therefore, the front-to-back tilt of image projector 12. Accordingly, adjustable support 50 can be used to adjust the side-to-side tilt and/or front-to-back tilt of image projector 12 so as to account for side-to-side and/or front-to-back tilt problems of platform 44 with respect to viewing surface 24.

Although illustrated and described above as having three supports in which one of the supports is an adjustable support 50, multimedia display device 10 can include any number of supports 40 spaced about perimeter edge 36, and any number of those supports 40 can be an adjustable support 50.

Figure 7:
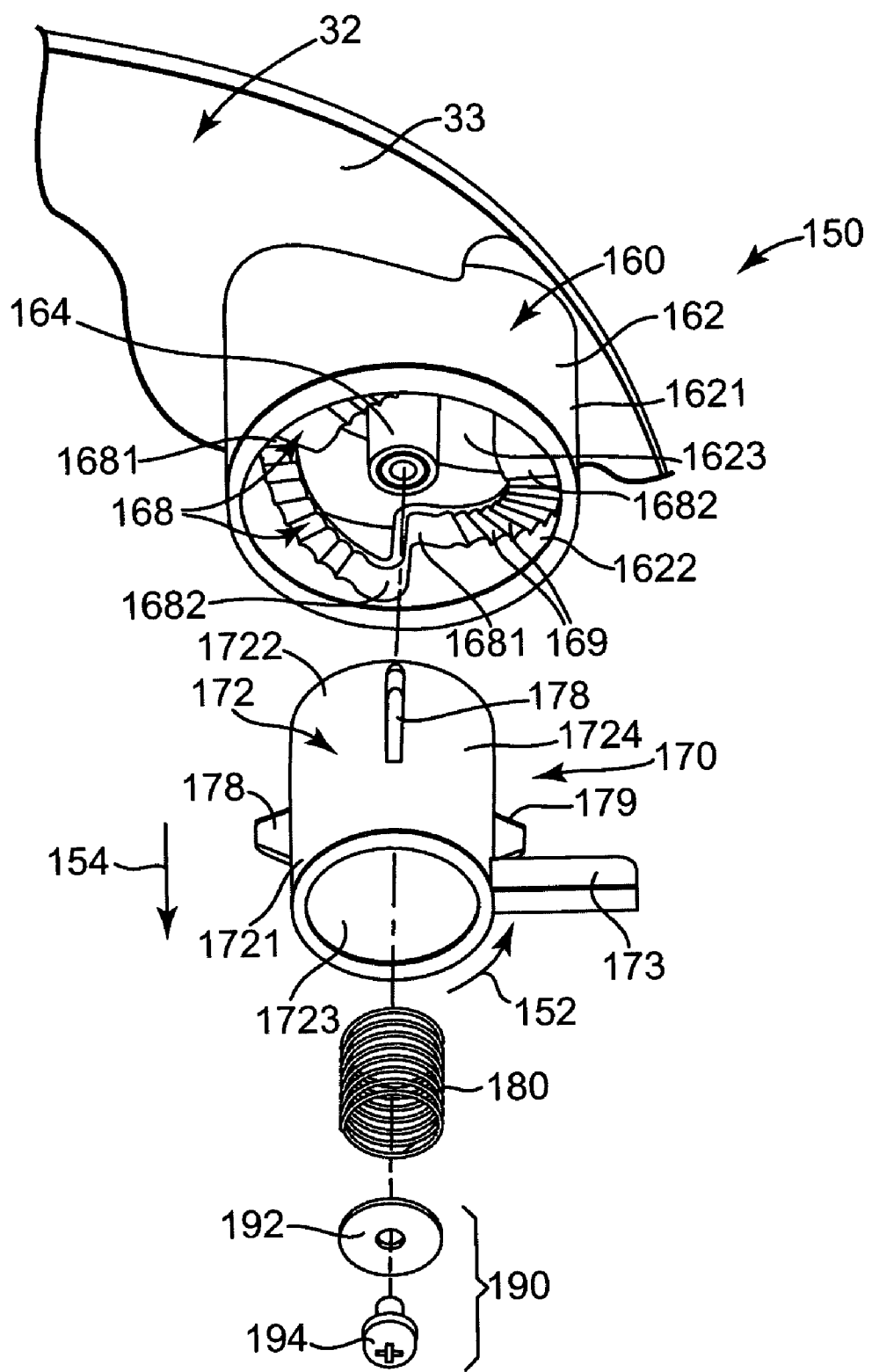
FIG. 7 is an exploded, bottom perspective view illustrating another embodiment of an adjustable support for a multimedia display device.
Figure 8:
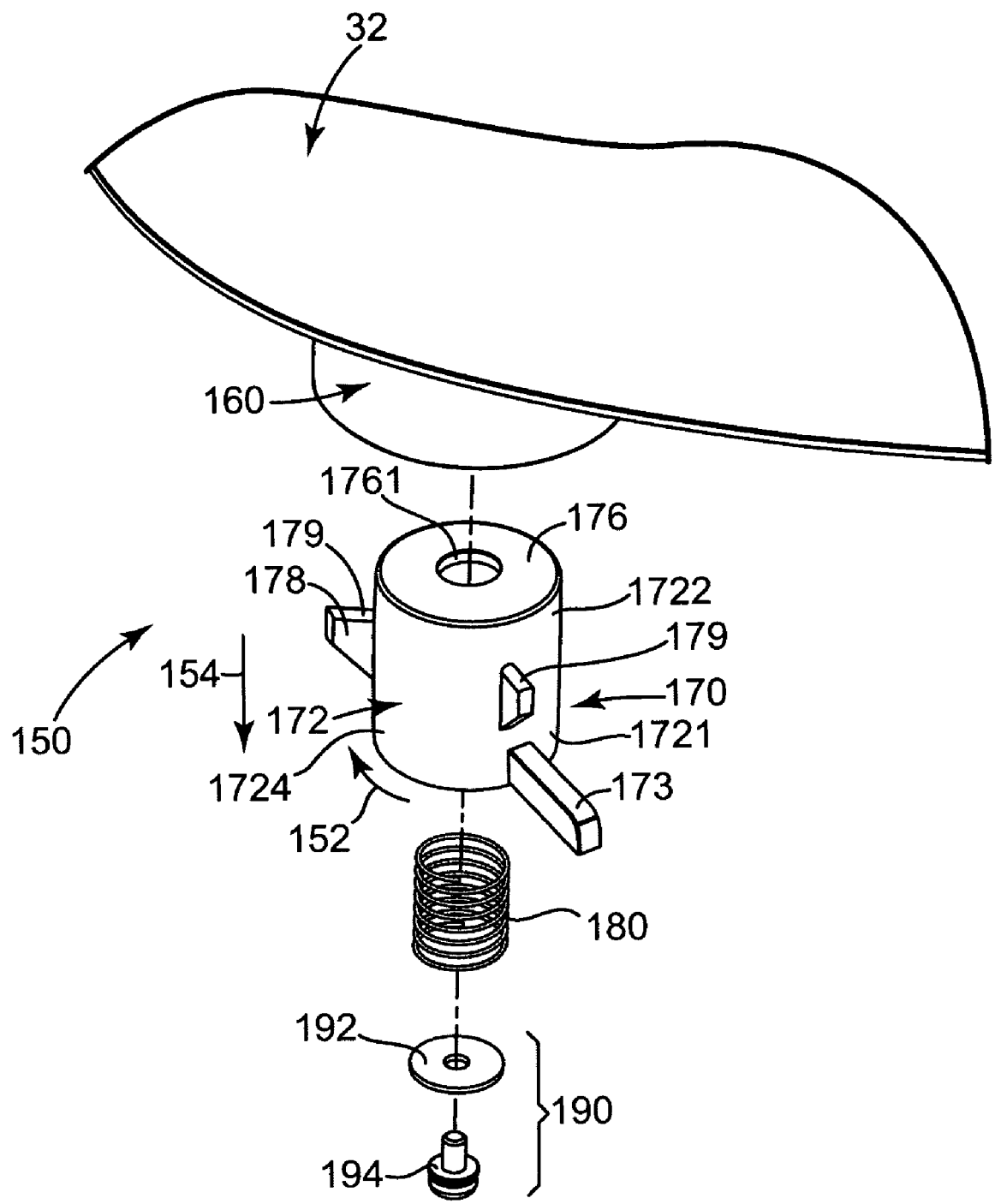
FIG. 8 is an exploded, top perspective view of the adjustable support of FIG. 7.

FIGS. 7 and 8 illustrate another embodiment of an adjustable support for multimedia display device 10. Adjustable support 150, similar to adjustable support 50 described above, allows second height $H_2$ to be varied and, therefore, enables image projector 12 to be leveled and/or tilted to adjust placement of the projected image upon viewing surface 24 (FIG. 3). In one embodiment, adjustable support 150 includes a base 160, a foot 170, a spring 180, and a retainer 190. In one embodiment, base 160 extends from flange 33 of shell 32 and, therefore, extends from perimeter edge 36 (FIG. 2) of shell 32. In one embodiment, base 160 is fixed with respect to shell 32. In one embodiment, base 160 is integrally formed with shell 32.

In one embodiment, base 160 includes a cylindrical portion 162 defining an outer circumference or surface 1621, an inner circumference or surface 1622, and a cavity 1623. In one embodiment, base 160 also includes a shaft 164 extended from flange 33 of shell 32 and through cavity 1623 of cylindrical portion 162. In one embodiment, shaft 164 is substantially cylindrical and concentrically positioned with respect to cavity 1623 of base 160. In one embodiment, shaft 164 is integrally formed with shell 32.

In one embodiment, base 160 additionally includes a plurality of cam or ramp surfaces 168 formed within cylindrical portion 162. In one embodiment, ramp surfaces 168 are distributed at substantially equal intervals along a common circumference of cylindrical portion 162. As such, ramp surfaces 168 are circumferentially spaced with respect to one another at substantially equal intervals.

In one embodiment, ramp surfaces 168 are inclined ramp surfaces circumferentially spaced along inner surface 1622. In addition, each ramp surface 168 is discrete from the other ramp surfaces 168. As such, each ramp surface 168 is separate and distinct from the other ramp surfaces 168.

In one embodiment, each ramp surface 168 has a first end 1681 and a second end 1682, wherein second end 1682 is spaced further from flange 33 than a respective first end 1681. In one embodiment, ramp surfaces 168 are spaced such that second end 1682 of one ramp surface 168 is adjacent to first end 1681 of another ramp surface 168. In one embodiment, first ends 1681 of ramp surfaces 168 are linearly aligned with each other so as to be positioned along a first circumference of base 160, and second ends 1682 of ramp surfaces 168 are linearly aligned with each other so as to be positioned along a second circumference of base 160 such that the second circumference of base 160 is spaced from the first circumference.

In one embodiment, as illustrated in FIGS. 7 and 8, each ramp surface 168 includes a stepped surface. As such, each ramp surface 168 includes a plurality of steps 169 following the curvature of inner surface 1622 of cylindrical portion 162. Notably, steps 169 of ramp surfaces 168 face downward or away from flange 33 of shell 32.

Foot 170 is configured to rotatably interact with base 160. In one embodiment, foot 170 includes a collar 172, a cap or end wall 176, and a plurality of wings or protrusions 178. In one embodiment, collar 172 is substantially cylindrical and has a lower edge 1721 and an upper edge 1722. In one embodiment, collar 172 has an inner circumference or surface 1723 and an outer circumference or surface 1724. In one embodiment, end wall 176 has an aperture 1761 formed therein. In one embodiment, aperture 1761 is substantially circular and sized to receive shaft 164 of base 160.

In one embodiment, protrusions 178 are circumferentially spaced and extend radially outward from outer surface 1724 of collar 172. In one embodiment, each protrusion 178 defines an engaging surface 179. As such, each engaging surface 179 is configured to interact with one ramp surface 168, as described below.

In one embodiment, a handle 173 extends radially from outer surface 1724 of collar 172. In one embodiment, handle 173 is provided adjacent lower edge 1721. Handle 173 is sized, shaped, and/or textured to facilitate grasping of handle 173 by a user and manipulating of foot 170, as described below.

Upon assembly of adjustable support 150, foot 170 is positioned to interact with base 160 such that shaft 164 of base 160 is received by aperture 1761 of foot 170. As such, foot 170 is rotatable about shaft 164. In addition, each engaging surface 179 interacts with one ramp surface 168.

In one embodiment, spring 180 is positioned around shaft 164 within collar 172 and retainer 190 is coupled to an end of shaft 164 extended through aperture 1761. As such, spring 180 biases foot 170 toward base 160. Accordingly, spring 180 maintains the position of foot 170 with respect to base 160. Thus, upon lifting of multimedia display device 10 from support surface 42 of platform 44, spring 180 maintains the position of foot 170 with respect to base 160. In one embodiment, retainer 190 includes a washer 192 and a screw 194, wherein screw 194 is threaded through washer 192 and into an end of shaft 164. Other arrangements for retaining spring 180 on shaft 164 are possible including, for example, retainer 90 as described above.

During use, rotation of foot 170 with respect to base 160 causes each engaging surface 179 of foot 170 to move or slide along one of the corresponding ramp surfaces 168 of base 160, thereby lowering or raising the position of foot 170 with respect to base 160. For example, if each of the engaging surfaces 179 is initially positioned near first end 1681 of the respective ramp surface 168 and foot 170 is rotated in the direction indicated by arrow 152, foot 170 will move in the vertical direction indicated by arrow 154 as each engaging surface 179 moves along the respective ramp surface 168 toward the second end 1682 of each ramp surface 168.

In one embodiment, steps 169 of ramp surfaces 168 partially impede movement of engaging surfaces 179 along ramp surfaces 168. As a result, a minimum rotational force applied to foot 170 to cause movement of foot 170 can be established. In addition, steps 169 allow foot 170 to be incrementally positioned and help maintain the established position of foot 170.

As illustrated in the embodiments of FIGS. 3 and 4, and similar to that described above with respect to adjustable support 50, movement of foot 170 with respect to base 160 increases or decreases second height $H_2$. Since first height $H_1$ remains substantially constant, movement of foot 170 accordingly varies angles $\theta_1$ and $\theta_2$ as defined between projection line 26 and reference line 28, respectively, and support surface 42. As such, rotation of foot 170 can be used to vary the orientation of reference line 28 with respect to support surface 42 and, therefore, the side-to-side tilt or leveling of image projector 12 and/or the orientation of projection line 26 with respect to support surface 42 and, therefore, the front-to-back tilt of image projector 12. Accordingly, adjustable support 150 can be used to adjust the side-to-side tilt and/or front-to-back tilt of image projector 12 so as to account for both leveling and/or tilt problems caused by platform 44 with respect to viewing surface 24.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An adjustable support for a multimedia display device, the adjustable support comprising:
    a base including a plurality of ramp surfaces; and
    a foot rotatably coupled with the base and including a plurality of engaging surfaces,
    wherein the plurality of ramp surfaces are separate from each other and distributed at substantially equal intervals along a common circumference, wherein each of the engaging surfaces interacts with a respective one of the ramp surfaces, and wherein rotation of the foot relative to the base causes each of the engaging surfaces to slide along the respective one of the ramp surfaces to vary a distance the foot extends from the base.

2. The adjustable support of claim 1, wherein rotation of the foot relative to the base for less than one revolution varies the distance the foot extends from the base between a minimum distance and a maximum distance from the base.

3. The adjustable support of claim 1, wherein the base includes a cylindrical portion, the plurality of ramp surfaces formed along a circumferential surface of the cylindrical portion.

4. The adjustable support of claim 1, wherein the foot includes a collar having an inner surface, the plurality of engaging surfaces formed along the inner surface of the collar.

5. The adjustable support of claim 1, wherein the foot includes a collar and a plurality of protrusions radially extending from the collar, each of the engaging surfaces defined by one of the protrusions.

6. The adjustable support of claim 1, wherein the plurality of ramp surfaces includes a first plurality of inclined surfaces and the plurality of engaging surfaces includes a second plurality of inclined surfaces each complimentary to one of the first plurality of inclined surfaces.

7. The adjustable support of claim 1, further comprising:
    a spring coupled with one of the foot and the base, wherein the spring biases the foot toward the base.

8. The adjustable support of claim 1, wherein each of the ramp surfaces includes at least one stepped surface.

9. The adjustable support of claim 1, wherein each of the ramp surfaces includes a curvilinear surface.

10. The adjustable support of claim 1, wherein the plurality of ramp surfaces includes three discrete ramp surfaces.

11. The adjustable support of claim 1, wherein the foot includes a friction-enhancing portion.

12. The adjustable support of claim 11, wherein the friction-enhancing portion includes rubber.

13. The adjustable support of claim 1, wherein the foot includes a shaft extending toward the base coaxial with the plurality of ramp surfaces.

14. The adjustable support of claim 13, further comprising:
    a spring positioned around the shaft of the foot and biasing the foot toward the base.

15. The adjustable support of claim 1, wherein the base includes a shaft coaxially extending through the plurality of ramp surfaces and into the foot.

16. The adjustable support of claim 15, further comprising:
    a spring positioned around the shaft of the base and biasing the foot toward the base.

17. The adjustable support of claim 1, wherein the foot includes a handle configured to facilitate rotation of the foot relative to the base.

18. The adjustable support of claim 1, wherein the plurality of ramp surfaces are circumferentially positioned with respect to one another and each of the ramp surfaces has a first end and a second end opposite the first end, wherein the second end of each of the ramp surfaces is adjacent the first end of another of the ramp surfaces.

19. The adjustable support of claim 18, wherein the first ends of the ramp surfaces are linearly aligned with each other along a first circumference and the second ends of the ramp surfaces are linearly aligned with each other along a second circumference.

20. The adjustable support of claim 18, wherein the first ends of the ramp surfaces are uniformly spaced from the second ends of the ramp surfaces.

21. A multimedia display device, comprising:
    a housing including a plurality of ramp surfaces;
    an image projector maintained within the housing;
    a media player maintained within the housing; and
    a foot rotatably coupled with the housing and including a plurality of engaging surfaces,
    wherein the plurality of ramp surfaces are circumferentially spaced with respect to one another at substantially equal intervals, wherein each of the engaging surfaces contacts a respective one of the ramp surfaces, and wherein each of the engaging surfaces are adapted to slide along the respective one of the ramp surfaces to vary a distance the foot extends from the housing.

22. The multimedia display device of claim 21, wherein rotation of the foot relative to the housing for less than one revolution varies the distance the foot extends from the housing between a minimum distance and a maximum distance from the housing.

23. The multimedia display device of claim 21, wherein the housing includes a cylindrical portion, the plurality of ramp surfaces formed along a circumferential surface of the cylindrical portion.

24. The multimedia display device of claim 21, wherein the foot includes a collar having an inner surface, the plurality of engaging surfaces formed along the inner surface of the collar.

25. The multimedia display device of claim 21, wherein the foot includes a collar and a plurality of protrusions extending from the collar, each of the engaging surfaces defined by one of the protrusions.

26. The multimedia display device of claim 21, wherein the plurality of ramp surfaces includes a first plurality of inclined surfaces and the plurality of engaging surfaces includes a second plurality of inclined surfaces each complimentary to one of the first plurality of inclined surfaces.

27. The multimedia display device of claim 21, wherein each of the ramp surfaces includes at least one stepped surface.

28. The multimedia display device of claim 21, wherein each of the ramp surfaces includes a curvilinear surface.

29. The multimedia display device of claim 21, wherein the plurality of ramp surfaces includes three discrete ramp surfaces.

30. The multimedia display device of claim 21, wherein the plurality of ramp surfaces and the plurality of engaging surfaces provide a plurality of discrete contact areas.

31. The multimedia display device of claim 21, wherein the plurality of ramp surfaces and the plurality of engaging surfaces provide a plurality of linearly spaced contact areas.

32. The multimedia display device of claim 21, further comprising:
a spring biasing the foot toward the housing.

33. The multimedia display device of claim 32, wherein the spring maintains contact between the engaging surfaces and the ramp surfaces.

34. The multimedia display device of claim 21, wherein the foot is adapted to rotate relative to the housing.

35. The multimedia display device of claim 21, wherein rotation of the foot relative to the housing varies a tilt angle of the image projector.

36. The multimedia display device of claim 21, wherein each of the ramp surfaces has a first end and a second end opposite the first end, wherein the first ends of the ramp surfaces are linearly aligned with each other and the second ends of the ramp surfaces are linearly aligned with each other.

37. The multimedia display device of claim 36, wherein the second end of each of the ramp surfaces is adjacent the first end of another of the ramp surfaces.

38. An adjustable support for a multimedia display device including an image projector, the adjustable support comprising:
means for supporting the image protector;
means for rotatably coupling a foot with the means for supporting the image projector;
means for varying a distance the foot extends from the means for supporting the image projector;
wherein the means for varying the distance includes a plurality of means for interacting with the means far supporting the image protector separate from the means for rotatably coupling the foot with the means for supporting the image projector, and
means for biasing the foot toward the means for supporting the image projector.

39. An adjustable support for a multimedia display device including an image projector, the adjustable support comprising:
means for supporting the image projector:
means for rotatably coupling a foot with the means for supporting the image projector;
means for varying a distance the foot extends from the means for supporting the image projector;
wherein the means for varying the distance includes a plurality of means for interacting with the means for supporting the image projector separate from the means for rotatably coupling the foot with the means for supporting the image projector; and
means for rotating the foot relative to the means for supporting the image projector.

40. An adjustable support for a multimedia display device including an image projector, the adjustable support comprising:
means for supporting the image projector;
means for rotatably coupling foot with the means for supporting the image projector;
means for varying a distance the foot extends from the means for supporting the image projector;
wherein the means for varying the distance includes a plurality of means for interacting with the means for supporting the image projector separate from the means for rotatably coupling the foot with the means for supporting the image projector; and
wherein the means for varying the distance the foot extends from the means for supporting the image projector includes a plurality of discrete and linearly spaced ramp surfaces.

41. An adjustable support for a multimedia display device including an image projector, the adjustable support comprising:
means for supporting the image projector;
means for rotatably coupling a foot with the means for supporting the image projector;
means for varying a distance the foot extends from the means for supporting the image projector;
wherein the means for a varying the distance includes a plurality of means for interacting with the means for supporting the image projector separate from the means for rotatably coupling the foot with the means for supporting the image projector; and
wherein the plurality of means for interacting with the means for supporting the image projector include one of a plurality of ramp surfaces and a plurality of engaging surfaces.

42. The adjustable support of claim 41, wherein the means for supporting the image projector include the other of the plurality of ramp surfaces and the plurality of engaging surfaces.

43. The adjustable support of claim 42, wherein each of the ramp surfaces includes a stepped surface.

44. The adjustable support of claim 42, wherein each of the ramp surfaces includes a curvilinear surface.

45. A method of adjusting tilt of a multimedia display device including an image projector, the method comprising:
supporting the image projector wit a support assembly including a plurality of ramp surfaces;
rotatably coupling a foot with the support assembly, the foot including a plurality of engaging surfaces; and
rotating the foot relative to the support assembly, including sliding each of the engaging surfaces along a respective one of the ramp surfaces and varying a distance the foot extends from the support assembly.

46. The method of claim 45, wherein rotating the foot relative to the support assembly includes rotating the foot for less than one revolution and varying the distance the foot extends from the support assembly between a minimum distance and a maximum distance from the support assembly.

47. The method of claim 45, wherein rotatably coupling the foot with the support assembly includes biasing the foot toward the support assembly.

48. The method of claim 45, wherein rotating the foot relative to the support assembly includes rotating the foot in a first direction and increasing the distance the foot extends from the support assembly.

49. The method of claim 48, wherein rotating the foot relative to the support assembly includes rotating the foot in a second direction opposite the first direction and decreasing the distance the foot extends from the support assembly.

50. The method of claim 45, wherein each of the ramp surfaces includes a curvilinear surface, and wherein rotating the foot relative to the support assembly includes sliding each of the engaging surfaces along the curvilinear surface of the respective one of the ramp surfaces.

51. The method of claim 45, wherein each of the ramp surfaces includes a stepped surface, and wherein rotating the foot relative to the support assembly includes sliding each of the engaging surfaces along the stepped suffice of the respective one of the ramp surfaces.

* * * * *

UNITED STATES PATENT AND TRADEMARK OFFICE
CERTIFICATE OF CORRECTION

PATENT NO. : 7,104,511 B2 Page 1 of 1
APPLICATION NO. : 10/946778
DATED : September 12, 2006
INVENTOR(S) : Smith et al.

It is certified that error appears in the above-identified patent and that said Letters Patent is hereby corrected as shown below:

In the Claims

Col. 11 (line 62), delete "far" and insert therefor --for--;

Col. 12 (line 4), delete "projector:" and insert therefor --projector;--.

Col. 12 (line 60) delete "wit" and insert therefor --with--.

Signed and Sealed this

Twentieth Day of November, 2007

JON W. DUDAS
*Director of the United States Patent and Trademark Office*